(12) United States Patent
Kulp et al.

(10) Patent No.: US 10,443,197 B1
(45) Date of Patent: *Oct. 15, 2019

(54) MODULAR TRAVEL WARNING STRIP SYSTEM AND METHODS

(71) Applicant: TRAFFIX DEVICES, INC., San Clemente, CA (US)

(72) Inventors: Jack H. Kulp, Dana Point, CA (US); Geoffrey B. Maus, Mission Viejo, CA (US); Jeremy Smith, San Clemente, CA (US)

(73) Assignee: TRAFFIX DEVICES, INC., San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,522

(22) Filed: Oct. 18, 2018

Related U.S. Application Data

(60) Continuation of application No. 15/727,499, filed on Oct. 6, 2017, now Pat. No. 10,106,938, which is a
(Continued)

(51) Int. Cl.
*B23K 26/40* (2014.01)
*B23K 26/38* (2014.01)
*B29C 43/18* (2006.01)
*B29C 43/36* (2006.01)
(Continued)

(52) U.S. Cl.
CPC ............ *E01F 9/529* (2016.02); *B23K 26/364* (2015.10); *B23K 26/38* (2013.01); *B23K 26/382* (2015.10);
(Continued)

(58) Field of Classification Search
CPC ..... E01F 9/047; E01F 9/04; E01F 9/06; E01F 9/093; E01F 15/02; E01F 15/086; E01F 15/00; E01F 13/10; A63H 18/00
See application file for complete search history.

(56) References Cited

U.S. PATENT DOCUMENTS 2,139,816 A    12/1938   Fordyce
3,334,554 A *   8/1967   Adams .................... E01F 9/512
                                                                           116/35 R
(Continued)

FOREIGN PATENT DOCUMENTS

JP      2005-098021 A    4/2005
KR    10-2009-0126365 A   12/2009
KR    10-2011-0130230 A   12/2011

*Primary Examiner* — Abagail A Risic
(74) *Attorney, Agent, or Firm* — Donald E. Stout; Stout, Uxa & Buyan, LLP

(57) ABSTRACT

A modular highway warning strip system which comprises a modular warning strip segment having first and second ends, a length extending between the first and second ends, two opposing lengthwise sides, a width extending between the opposing lengthwise sides of the segment, top and bottom surfaces, and a thickness. Each of the first and second ends comprise at least one male protrusion and at least one female receptacle, wherein the at least one male protrusion is configured to engage the at least one female receptacle for joining a plurality of the segments together end-to-end. A segmented metallic plate is disposed between upper and lower rubber layers, the segmented plate comprising a plurality of segments separated by slits comprising living hinges.

16 Claims, 11 Drawing Sheets

Related U.S. Application Data division of application No. 15/009,695, filed on Jan. 28, 2016, now Pat. No. 9,783,941.

(60) Provisional application No. 62/109,043, filed on Jan. 28, 2015.

(51) Int. Cl.
| | |
|---|---|
| *E01F 15/00* | (2006.01) |
| *E01F 15/02* | (2006.01) |
| *E01F 9/529* | (2016.01) |
| *B23K 26/402* | (2014.01) |
| *B23K 26/382* | (2014.01) |
| *B29C 43/20* | (2006.01) |
| *B23K 26/364* | (2014.01) |
| *B23K 103/00* | (2006.01) |
| *B29K 21/00* | (2006.01) |
| *B29K 105/24* | (2006.01) |
| *B29K 705/12* | (2006.01) |
| *B29K 105/26* | (2006.01) |

(52) U.S. Cl.
CPC ............ *B23K 26/402* (2013.01); *B29C 43/18* (2013.01); *B29C 43/203* (2013.01); *B29C 43/36* (2013.01); *B23K 2103/42* (2018.08); *B29C 2043/182* (2013.01); *B29C 2043/3602* (2013.01); *B29K 2021/006* (2013.01); *B29K 2105/246* (2013.01); *B29K 2105/26* (2013.01); *B29K 2705/12* (2013.01); *E01F 15/00* (2013.01); *E01F 15/02* (2013.01)

(56) References Cited

U.S. PATENT DOCUMENTS

| | | | |
|---|---|---|---|
| 3,851,225 A * | 11/1974 | Luchetta | H02B 1/46 174/DIG. 2 |
| 4,309,124 A | 1/1982 | Bertels | |
| 4,542,709 A * | 9/1985 | Spaugh | B60Q 7/00 116/63 P |
| 4,586,847 A * | 5/1986 | Stanton | B02C 19/16 172/40 |
| 4,896,993 A * | 1/1990 | Bohnhoff | E01C 5/20 404/33 |
| 5,306,105 A * | 4/1994 | Langbrandner | E01F 9/588 404/12 |
| 5,450,077 A * | 9/1995 | Tyburski | E01F 11/00 200/86 A |
| 5,769,563 A | 6/1998 | Flynn | |
| 5,775,834 A | 7/1998 | Jackson | |
| 6,309,137 B1 * | 10/2001 | Hirsch | E01F 9/529 404/15 |
| 7,104,299 B2 * | 9/2006 | Rayman | B60C 1/0016 152/170 |
| 7,731,448 B2 * | 6/2010 | Fillie | E01F 9/529 404/15 |
| 7,736,087 B1 | 6/2010 | Mettler et al. | |
| 8,118,517 B2 | 2/2012 | Kelley et al. | |
| 8,807,864 B2 | 8/2014 | Kulkarni et al. | |
| 2003/0194371 A1 | 10/2003 | Lehmann et al. | |
| 2007/0125601 A1 * | 6/2007 | Lutze | B29C 43/203 182/222 |
| 2010/0215431 A1 | 8/2010 | Mettler et al. | |
| 2011/0150569 A1 | 6/2011 | Christensen | |
| 2014/0190395 A1 | 6/2014 | Cowan | |
| 2014/0270937 A1 | 9/2014 | Kulkarni et al. | |
| 2015/0030390 A1 * | 1/2015 | Brown | E01F 9/529 404/15 |
| 2015/0110554 A1 * | 4/2015 | Mettler | E01F 9/529 404/15 |
| 2015/0216021 A1 * | 7/2015 | Bennett | H05B 37/0272 362/555 |
| 2015/0376849 A1 * | 12/2015 | Thompson | |

* cited by examiner

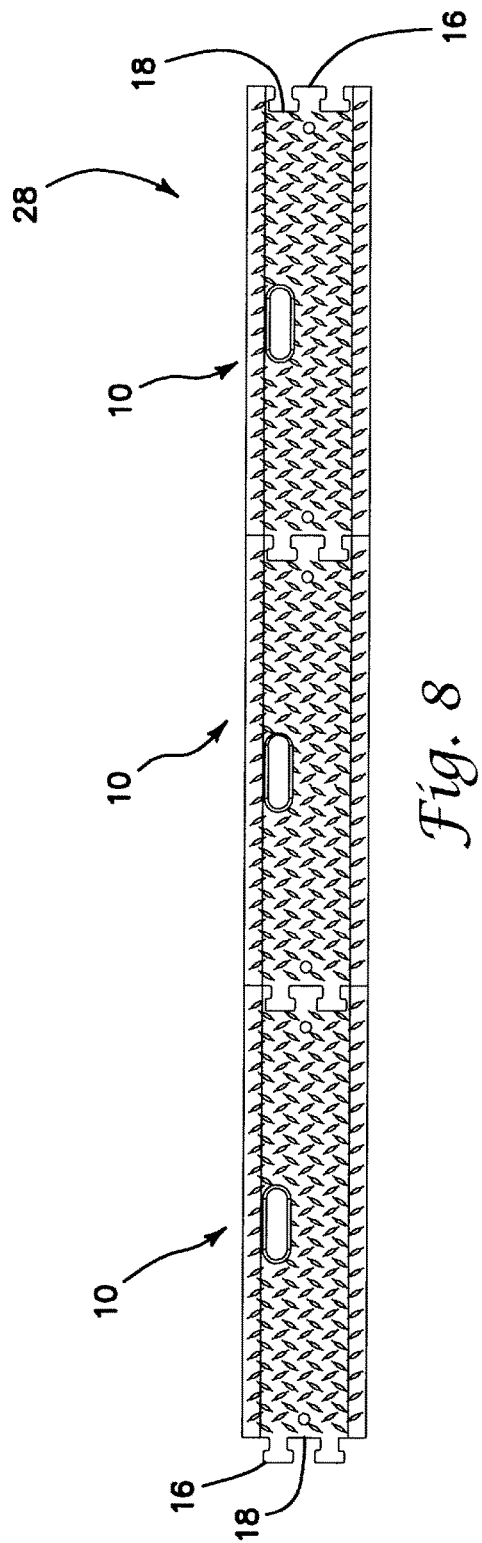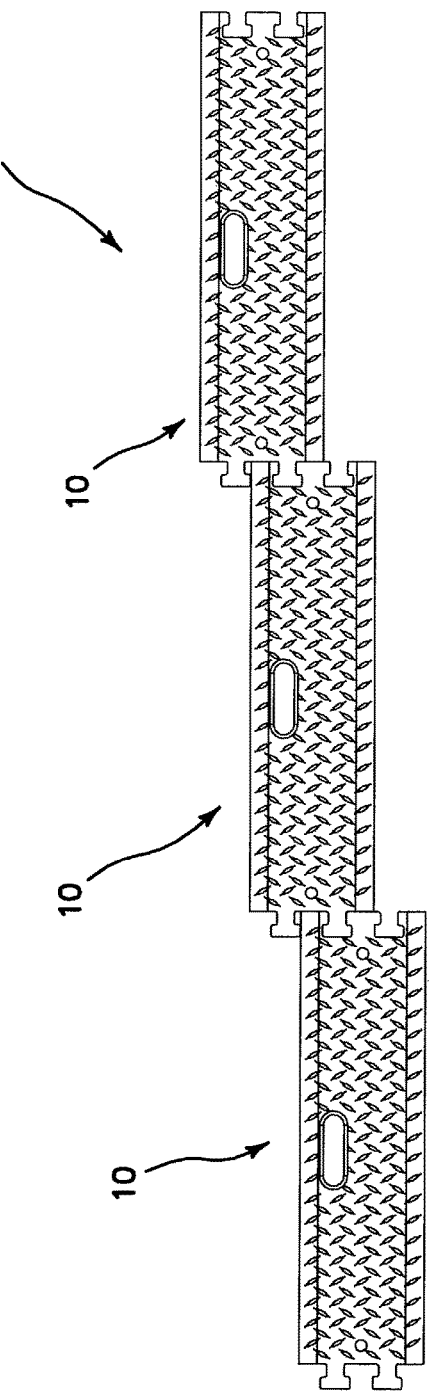

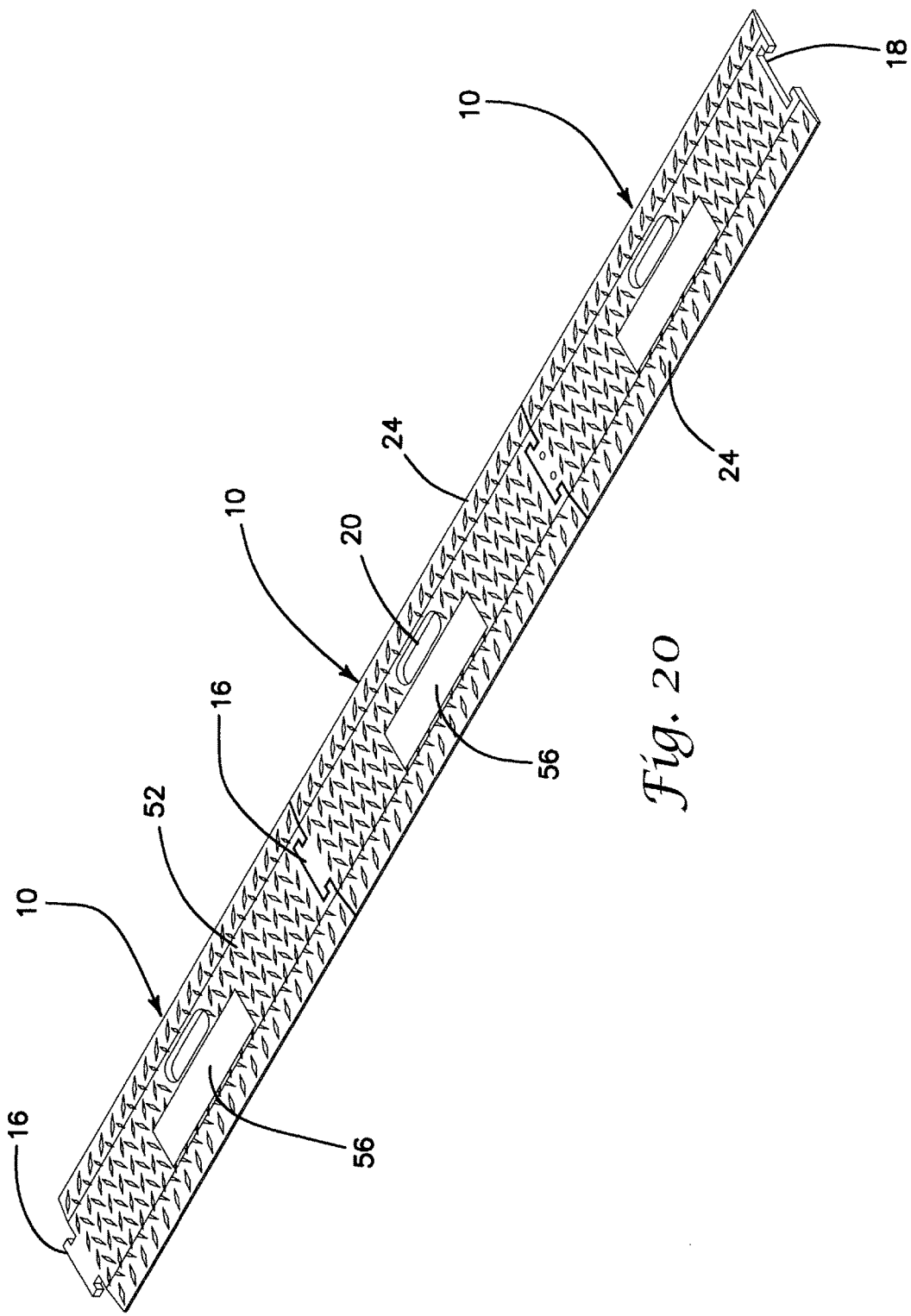

MODULAR TRAVEL WARNING STRIP SYSTEM AND METHODS

This application is a continuation application under 35 U.S.C. 120 of U.S. application Ser. No. 15/727,499, entitled Modular Travel Warning Strip System and Methods, filed on Oct. 6, 2017, now U.S. Pat. No. 10,106,938, issued on Oct. 23, 2018, which in turn is a divisional application under 35 U.S.C. 120 of U.S. application Ser. No. 15/009,695, entitled Modular Travel Warning Strip System and Methods, filed on Jan. 28, 2016, now U.S. Pat. No. 9,783,941, issued on Oct. 10, 2017, which in turn claims the benefit under 35 U.S.C. 119(e) of the filing date of Provisional U.S. Application Ser. No. 62/109,043, entitled Modular Travel Warning Strip System and Methods, filed on Jan. 28, 2015. Additionally, the present application is related to prior U.S. Utility patent application Ser. No. 14/216,299, entitled Modular Travel Warning Strip System and Methods, filed on Mar. 17, 2014, and U.S. Provisional Application Ser. No. 61/789,396, entitled Modular Travel Warning Strip System and Methods, filed on Mar. 15, 2013. All of the foregoing applications are commonly assigned with the present application, and are each expressly incorporated herein by reference, in their entirety.

BACKGROUND OF THE INVENTION

Warning or, more popularly, rumble strips are well known in the highway industry, particularly for high speed highway applications in order to provide an easily detectable noise and vibration, when driven over. They are typically used to warn approaching drivers of a hazard ahead, such as a toll booth, the end of a freeway, a sharp curve, or the like. Permanent rumble strips are placed in the pavement of the roadway for such permanent hazards as are described above. In other circumstances, where the hazard is temporary, such as a construction zone, vehicular accident, checkpoint, or the like, temporary rumble strips may be useful. Such a temporary rumble strip system is disclosed in U.S. Pat. No. 7,736,087 to Mettler et al., which patent is herein expressly incorporated by reference.

SUMMARY OF THE INVENTION

The invention described herein is a portable rumble or warning strip system which has a number of advantages compared to prior art systems of the type. One such advantage is that the system can be produced at a significantly lower cost, because of improved molding techniques and the ability to utilize recycled and lower cost rubber materials. This advantage, of course, affords a significant environmental benefit compared to prior art products molded of relatively expensive polyurethane. Other advantages include greater ease of assembly and disassembly, availability in a variety of colors, a carrying handle for ease of transport, stacking lugs for easy stackability of multiple modules, jigsaw style connections for maximum assembly options, and lengthwise metallic cables to offer stability and additional weight.

More particularly, there is provided a modular highway warning strip system which comprises a modular warning strip segment having first and second ends, a length extending between the first and second ends, two opposing lengthwise sides, a width extending between the opposing lengthwise sides of the segment, top and bottom surfaces, and a thickness. Each of the first and second ends comprises at least one male protrusion and at least one female receptacle, wherein the at least one male protrusion is configured to engage the at least one female receptacle. Each male protrusion is located along the width of the segment so that it aligns with a widthwise location of a corresponding female receptacle on the opposing end of the segment. Accordingly, two of the segments may be joined end-to-end in a flush manner by engaging each of the male protrusions on each of the two adjoining segment ends with aligned female receptacles on the other of the two adjoining segment ends.

A handle is preferably formed in the segment, the handle comprising an opening through the thickness of the segment, open on both the top and bottom surfaces thereof, and large enough to accommodate a gloved adult hand.

Each of the opposing lengthwise sides comprise ramps, wherein the top surface of the segment slopes downwardly to the outside edge thereof so that the edge of the segment has a smaller thickness than a center portion of the segment. In one embodiment, the ramps are sloped downwardly at an angle of approximately 15 degrees.

Adjacent ones of the segments may be adjoined in an offset relationship by engaging a male protrusion on one end of a first segment into a non-aligned female receptacle on the adjoining end of a second segment, wherein after the engagement, the respective segments are joined in a flush manner, but with offset respective widths, so that a length of the two joined segments is substantially exactly twice the length of a single segment, but a width of the two joined segments is substantially greater than the width of a single one of the segments. In practice, the width of the two joined segments is at least about a third greater than the width of one of the segments. In one particular embodiment, wherein the width of a single segment is about 12 inches, the width of the two joined segments is about five inches greater than the width of one of the segments.

At least one stacking lug may be disposed on the top surface of the segment, and a corresponding stacking recess for flushly receiving a stacking lug may be disposed on the bottom surface of the segment.

The segment is typically molded of rubber. In some embodiments, it may be molded in a sandwich construction, comprising a top layer of colored vulcanizable rubber, a bottom layer of colored vulcanizable rubber, and a middle core layer of black vulcanizable rubber.

Advantageously, the system further comprises a plurality of metallic cables molded into the segment and extending along substantially the entire length thereof. One of the cables extends into each of the male protrusions to provide support and stiffness to ensure a secure engagement with the adjoining segment. The cables are preferably formed of corrosion-resistant steel. Additionally, the cables are joined together to form a cable mat. The mat is molded into the segment, which segment is molded of rubber.

In another aspect of the invention, there is provided a modular highway warning strip system which comprises a modular warning strip segment having first and second ends, a length extending between the first and second ends, two opposing lengthwise sides, a width extending between the opposing lengthwise sides of the segment, top and bottom surfaces, and a thickness. Each of the first and second ends comprise at least one male protrusion and at least one female receptacle, wherein the at least one male protrusion is configured to engage the at least one female receptacle for joining a plurality of the segments together end-to-end. Advantageously, a plurality of metallic cables are molded into the molded rubber segment and extend along substantially the entire length thereof. One of the metallic cables extends into each of the male protrusions. The cables are preferably formed of corrosion-resistant steel, and preferably are joined together to form a cable mat. The mat is molded into the segment, which segment is molded of rubber.

Adjacent ones of the segments may be adjoined in an offset relationship by engaging a male protrusion on one end of a first segment into a non-aligned female receptacle on the adjoining end of a second segment, wherein after the engagement the respective segments are joined in a flush manner, but with offset respective widths. Thus, a length of the two joined segments is substantially exactly twice the length of a single segment, but a width of the two joined segments is substantially greater than the width of a single one of the segments. In practice, the width of the two joined segments is at least about a third greater than the width of one of the segments. In one particular embodiment, wherein the width of a single segment is about 12 inches, the width of the two joined segments is about five inches greater than the width of one of the segments.

In a modified embodiment of the invention, there is provided a modular highway warning strip system which comprises a modular warning strip segment having first and second ends, a length extending between the first and second ends, two opposing lengthwise sides, a width extending between the opposing lengthwise sides of the segment, top and bottom surfaces, and a thickness. Each of the first and second ends comprise at least one male protrusion and at least one female receptacle, wherein the at least one male protrusion is configured to engage the at least one female receptacle. The modular warning strip segment comprises an upper rubber layer, a lower rubber layer, and a segmented metallic plate, preferably comprising steel, disposed between the upper and lower rubber layers, the segmented plate comprising a plurality of segments separated by slits comprising living hinges.

A handle is formed in the segment, which comprises an opening through the thickness of the segment, open on both the top and bottom surfaces thereof, and large enough to accommodate a gloved adult hand. Each of the opposing lengthwise sides comprise ramps, wherein the top surface of the segment slopes downwardly to the outside edge thereof so that the edge of the segment has a smaller thickness than a center portion of the segment. In preferred embodiments, the ramps are sloped downwardly at an angle of approximately 10 degrees. The slits comprising living hinges are filled with rubber. Metallic lands are disposed in spaced relationship along a length of each of the living hinges, the lands each extending across the slit comprising the living hinge.

A plurality of holes are disposed in spaced relationship across the metallic plate, and, during the molding process are filled with rubber, the rubber filling the plurality of holes joining the upper layer of rubber to the lower layer of rubber. In one embodiment, one of the plurality of holes is disposed in each of the plurality of segments.

A plurality of the above described modular warning strip segments may be joined together end-to-end by engagement of corresponding ones of the male protrusion and female receptacle to form a desired roadway rumble strip.

In another aspect of the invention, there is described a method of making a modular highway warning strip. The method comprises steps of fabricating a segmented metallic plate by cutting a grid of slits lengthwise and widthwise across the plate to form a plurality of segments separated by and defined by said slits, preferably using a laser cutter, and forming a plurality of holes across a surface of the segmented plate which extend through a thickness of the plate.

A first layer of rubber is laid in a compression mold. The segmented metallic plate is placed over the first layer of rubber so that the locating pins extend through holes on the metallic plate, following which an additional step involves laying a second layer of rubber atop the metallic plate. Heat is then applied to the mold, sufficient to liquefy the rubber layers, so that rubber flows through the holes formed in the segmented plate and into the slits in the segmented plate. When the molding process is completed, the molded modular highway warning strip is removed from the mold.

The invention, together with additional features and advantages thereof, may best be understood by reference to the following description taken in conjunction with the accompanying illustrative drawings.

BRIEF DESCRIPTION OF THE DRAWINGS

FIG. 8 illustrates three modular warning segments of the invention which have been joined together in end-to-end fashion;

FIG. 9 is a view similar to FIG. 8 illustrating another option for joining the modular warning segments of the invention together in an offset relationship;

FIG. 20 illustrates an assembly of three modular warning strip segments of the type shown in FIGS. 15-19 joined end-to-end in a manner similar to the segments shown in FIG. 8.

DESCRIPTION OF THE INVENTION

Figure 1:
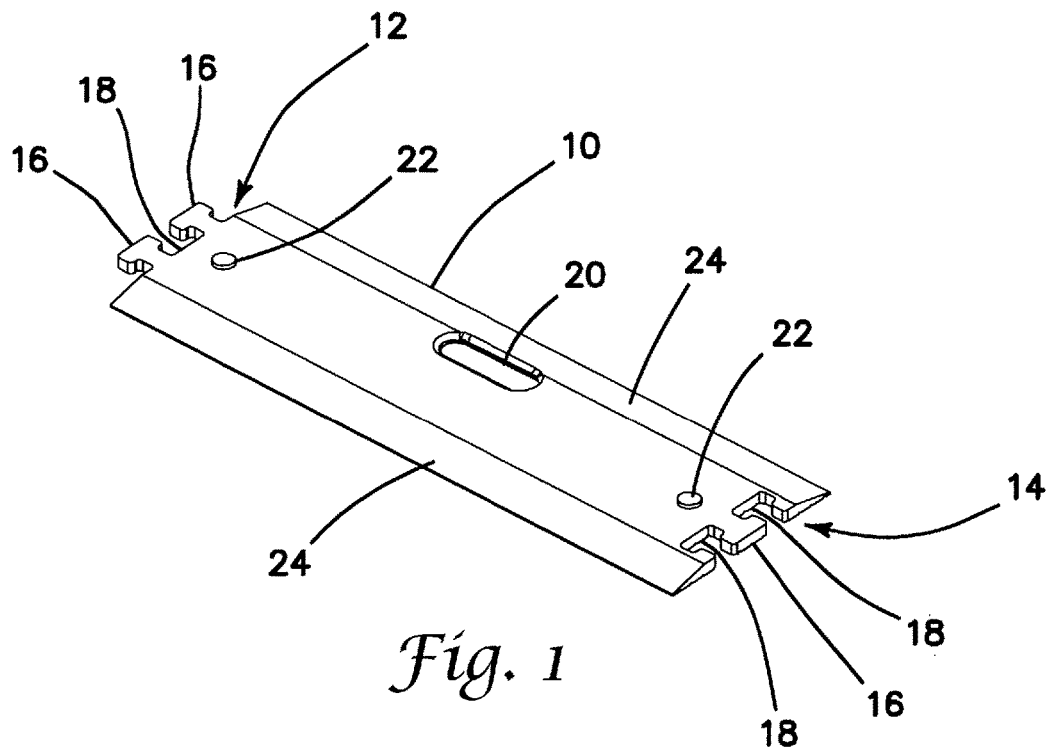
FIG. 1 is an isometric view of a modular warning strip segment constructed in accordance with the principles of the invention.

Referring now more particularly to the drawings, there is shown in FIGS. 1-6 a modular warning strip segment or traffic control bump 10 having a first end 12 and a second end 14, wherein each end comprises male protrusions 16 and female receptacles 18 adapted for joining adjacent opposed ends of similar segments 10 for the purpose of configuring a desired warning strip configuration. The segment 10 is comprised of rubber. The rubber may be, preferably, recycled rubber. Generally, the color of the material forming the segment is black, but other colors may be utilized, such as orange and white, and variations, such as using yellow portions along each lengthwise side, are within the scope of the invention. A handle 20 is formed in the segment for convenient transport. The handle 20 is preferably large enough to accommodate a gloved hand. Male stacking lugs 22, with corresponding female recesses (not shown) in the underside surface of the segment 10, may be formed on each end, if desired, but are not required. Also, of course, the location of the stacking lugs and corresponding female recesses along the top and bottom surfaces of the segment 10 may vary as desired. Each lengthwise side of the segment 10 comprises a downwardly ramped portion 24, to a thinner profile compared to the full thickness of the center portion of the segment, to assist traversal over the segments. The bidirectional ramp feature eliminates the issue of orientation of the segment on the roadway. In the illustrated embodiments, the ramps 24 are sloped at an angle of approximately 10-15 degrees, though that angle may be varied if desired. Advantageously, the jigsaw ends of each segment may also function as a handle if desired.

In one particular embodiment, the full thickness of each segment is about 1½ inches, and each segment 10 is about 46 to 46½ inches in length. The width of each segment is about 12 inches in some embodiments and about 13 inches in others. Other embodiments may employ varying thicknesses, such as about 1 inch or about 0.75 inches. Each segment may weigh between about 24 and 40 lb. Joining three segments 10 together, as shown in FIGS. 8 and 9, will create a warning strip which covers approximately the width of one typical roadway travel lane of 11 to 12 feet. The dimensions discussed throughout this application are representative only—variations are possible and even desirable, depending upon particular application.

Figure 11:
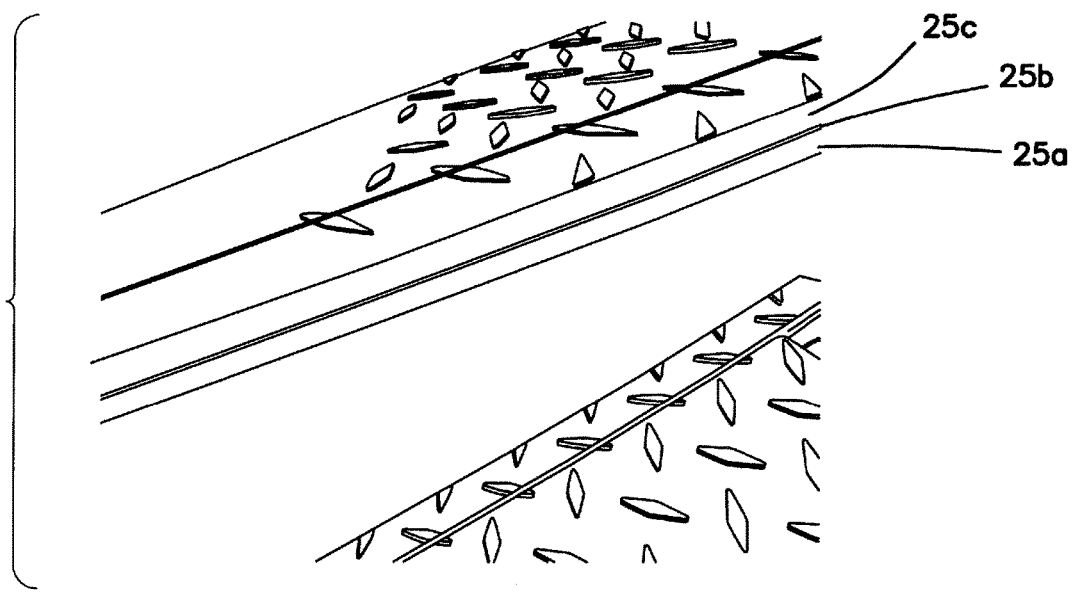
FIG. 11 is another view of a modular warning segment of the present invention having a sandwich construction.
Figure 12:
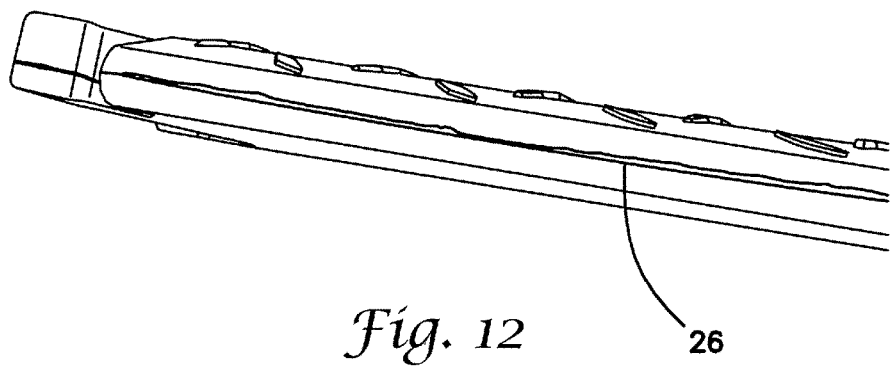
FIG. 12 is yet another view of a modular warning segment of the present invention having a sandwich construction.
Figure 13:
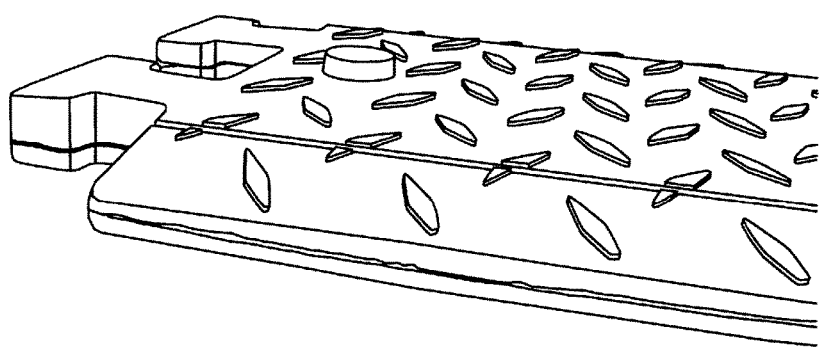
FIG. 13 is still another view of a modular warning segment of the present invention having a sandwich construction.

FIGS. 10-13 illustrate a unique alternative sandwich construction for the segments 10 of the present invention, to permit production of segments 10 in multiple colors. The segment 10 is made as a sandwich. As shown in FIG. 11, a thin layer 25a of colored vulcanizable rubber is laid into a mold, after which a second layer 25b of inexpensive black vulcanizable rubber is laid on top of the first layer. Then, a third thin layer 25c of colored vulcanizable rubber is laid on top of the second black layer 25b. This sandwich is then pressed and vulcanized into a finished part. Externally, the finished part has the appearance of a solid colored part, which the exception of the parting line 26 as shown, for example, in FIG. 12. An advantage of this approach is that the part is much less expensive to produce, as the black core rubber is much less expensive. The core rubber does not need to be U.V. stabilized, or have other expensive additives, as it is inside the protective shell of the colored outer layers.

As noted above, FIGS. 8 and 9 illustrate two exemplary approaches for deploying the modular warning segments 10 to create a rumble or warning strip assembly 28 or 30, respectively. In FIG. 8, the assembly 28 is merely three segments 10 joined end-to-end using the respective male protrusions 16 and female receptacles 18, respectively, wherein male protrusions 16 on one end of a segment 10 are inserted into corresponding female receptacles on the opposing end of an adjacent segment 10, the female receptacles 18 being open, so that the engagement of the male protrusions 16 into corresponding female receptacles 18 is in the fashion of the joining together of jigsaw puzzle pieces. Accordingly, a flush engagement of the opposing segment ends is created, as shown. On the other hand, FIG. 9 illustrates one example of the versatility of the inventive system, in that the segments 10 are designed for offset joinder as well, in either offset direction, because any male protrusion 16 is adapted for flush engagement with any female receptacle 18. This versatility allows for the creation of warning strip assemblies having a great number of different orientations, thereby maximizing the functionality of the inventive system. As shown in FIG. 9, by offsetting the connections between adjacent segments 10, a warning strip assembly 30 has a total width of approximately 22 inches in the illustrated example, rather than the width of warning strip assembly 28, which is limited to the width of a single segment 10, or about 12 inches in the illustrated embodiment. In other words, each segment 10 is offset about 5 inches relative to adjacent segments, when joined in the illustrated offset manner. However, the total length of the assembly remains the same as for the FIG. 8 assembly 28—approximately 11 ft, 2½ inches in one representative embodiment.

Figure 2:
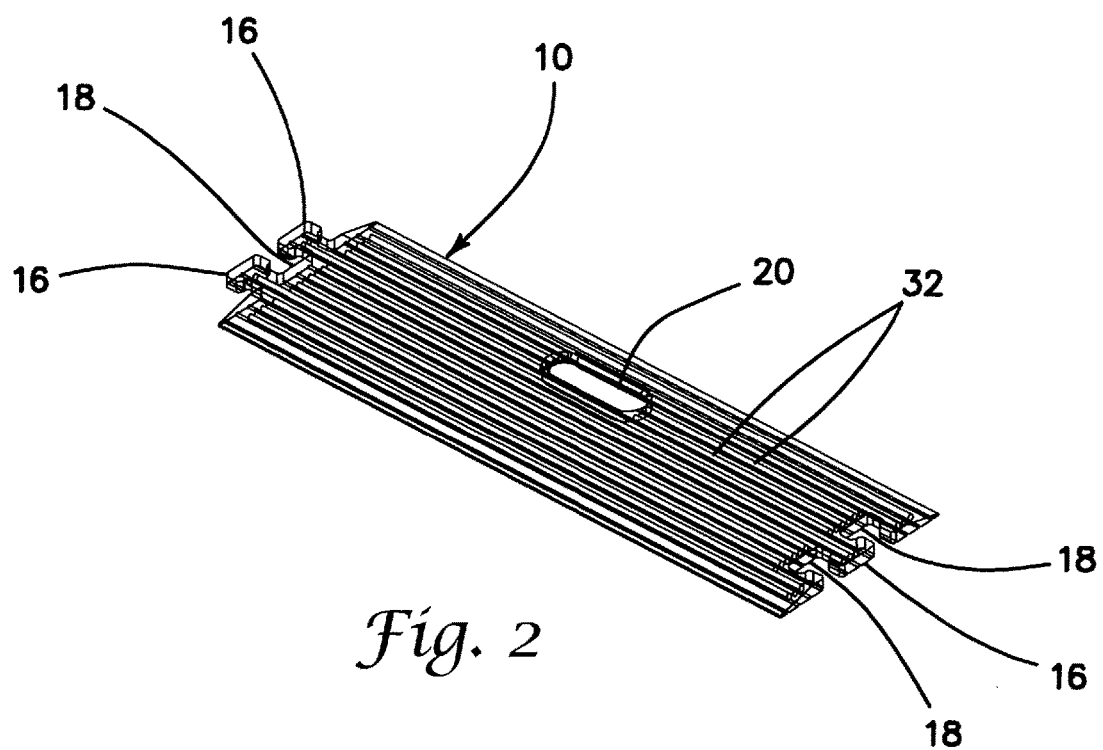
FIG. 2 is a view similar to that of FIG. 1, wherein hidden lines are shown in order to reveal the internal construction of the segment.
Figure 3:
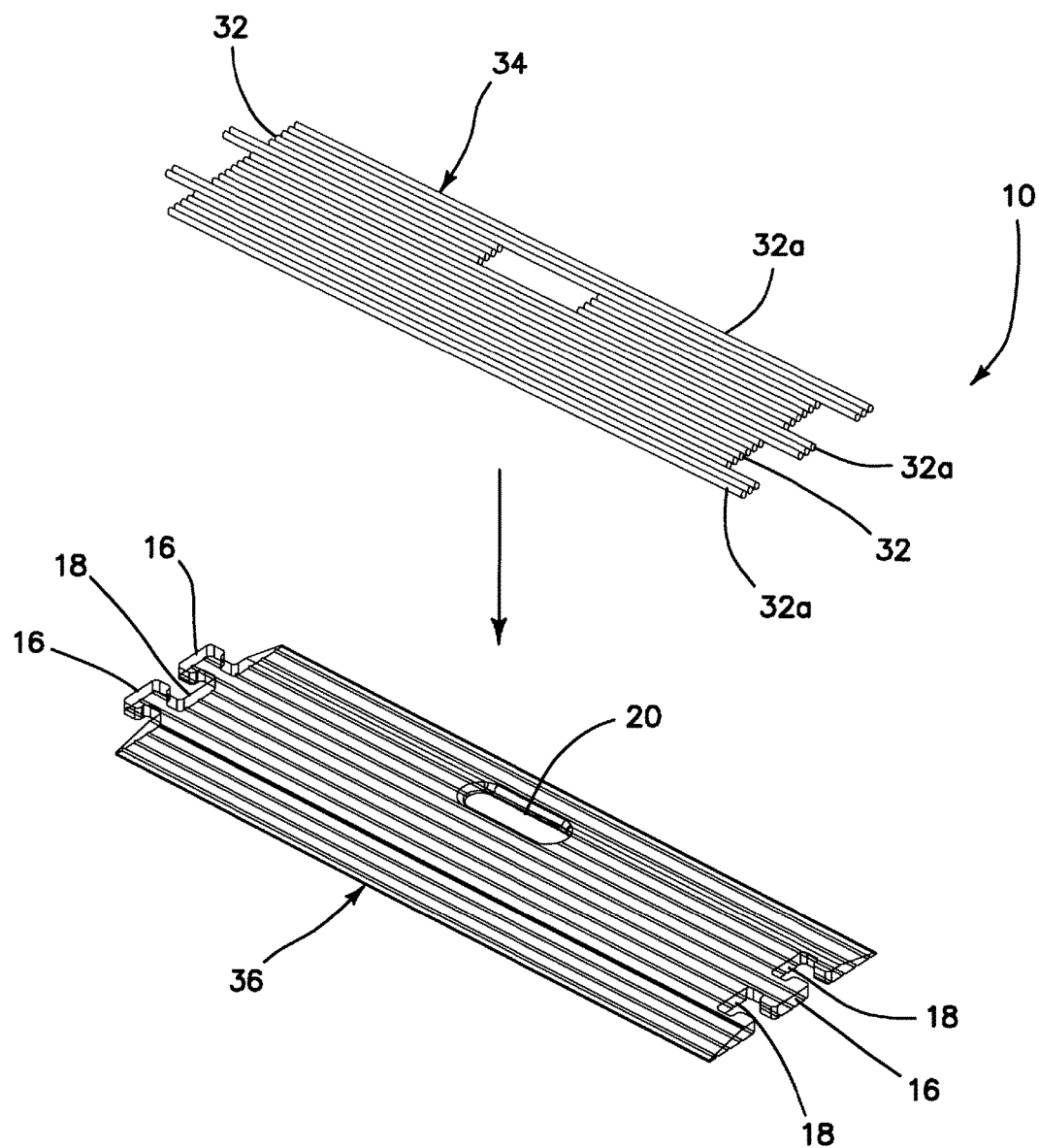
FIG. 3 is an isometric view similar to FIGS. 1 and 2 illustrating a steel cable mat which forms a part of the inventive warning strip segment apart from the molded segment.
Figure 4:
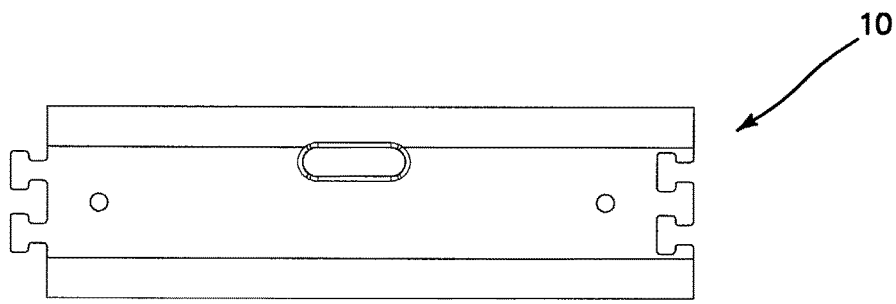
FIG. 4 is a top view of the inventive modular warning strip segment of FIG. 1.
Figure 5:
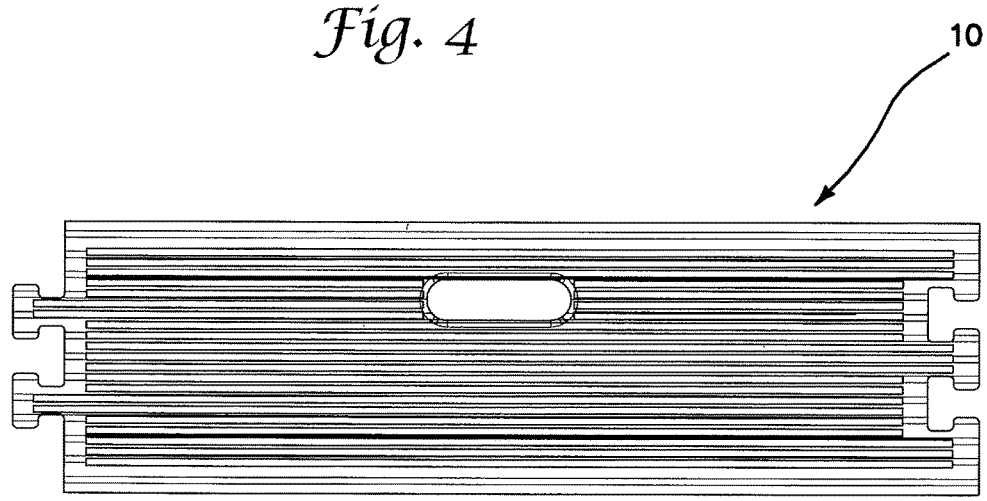
FIG. 5 is a top view similar to FIG. 4, of the modular warning segment as it is shown in FIG. 2, with hidden lines shown for clarity.
Figure 6:
FIG. 6 is a side view of the warning segment of FIGS. 1 and 4.
Figure 7:
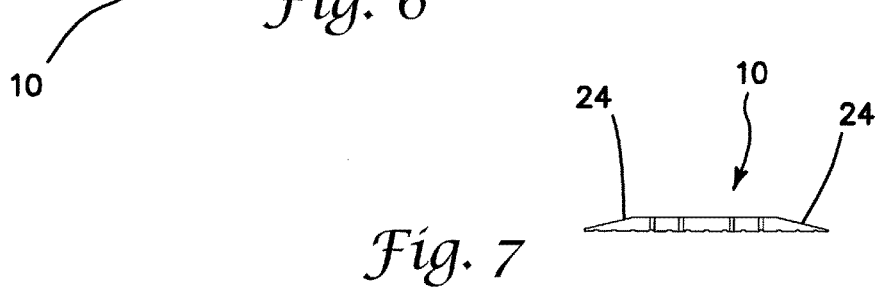
FIG. 7 is an end view of the warning segment of FIGS. 1 and 4.
Figure 10:
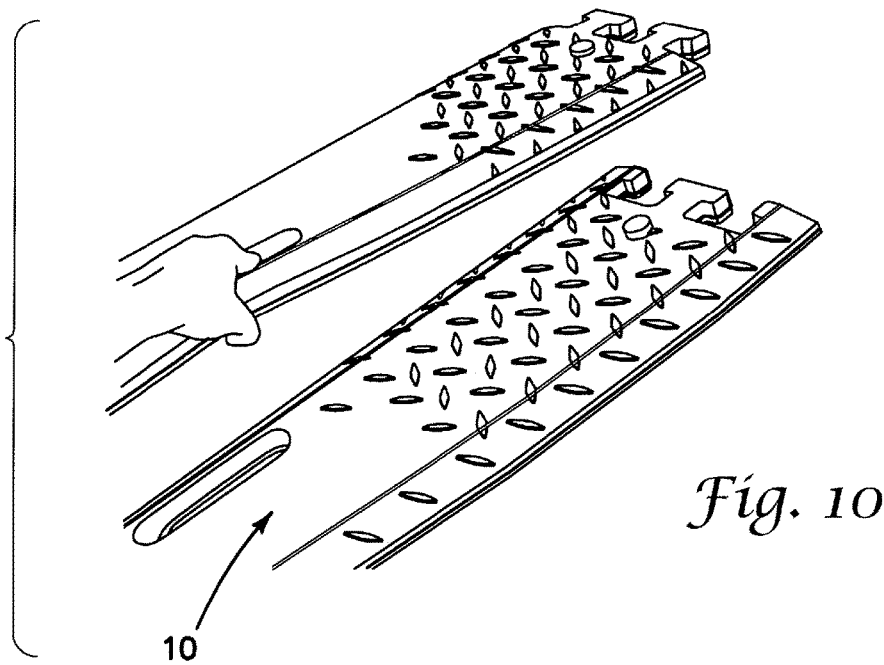
FIG. 10 illustrates another embodiment of the modular warning segments of the invention which have been constructed in a sandwich fashion for the purpose of having multiple colors.

Although the inventive segments 10 may simply be comprised of molded rubber, preferably recycled rubber, or of a sandwich construction, as shown in FIGS. 10-13, a particularly advantageous embodiment of the present invention is illustrated in FIGS. 2, 3, and 5. Applicant has discovered that it is particularly beneficial to mold the segment 10 to include a plurality of metallic cables 32 running lengthwise within the segment. As shown in FIG. 3, these cables 32 may be formed as a single cable mat 34, preferably formed of corrosion-resistant steel cables 32, though the cable material may be varied depending upon application. The mat 34 is molded together with a molded rubber segment 36, such as vulcanized rubber, to form the segment 10 shown in FIG. 2.

Notably, as shown, some of the cables 32a forming the cable mat 34 have an extended length so that they extend into the male protrusions 16 on both ends of the segment 10, once the cable mat 34 is molded into the rubber mat 36.

Advantageously, the steel cables 32, 32a running lengthwise along the segments 10 provide added weight for each segment 10, which allows for the use of less rubber to make the segment, thereby saving cost and bulk. More significantly, the cables function to substantially stiffen and strengthen the projections 16 to significantly improve the connection between adjacent segments 10, as well as strengthening the ramps 24 on each side of the segment.

Referring now to FIGS. 14-19, there is shown in these figures a modified embodiment of a modular warning strip segment 10 constructed in accordance with the principles of the present invention. In connection with these figures, like elements will be identified by like reference numerals to those used in connection with FIGS. 1-13. In this embodiment, rather than using the cables 32, 32a to reinforce the rubber segment 10, a segmented metallic plate 38 is utilized (FIGS. 15-19). The plate 38, preferably fabricated of steel, adds critical ballast weight of about 32 lb. Including about 12 lb of rubber encasing the steel plate, the combined weight of the entire assembly 10 is about 44 lb., in one particular embodiment. Of course, size and weight of the foregoing described parts may change within the scope of the inventive system, depending upon application.

Figure 15:
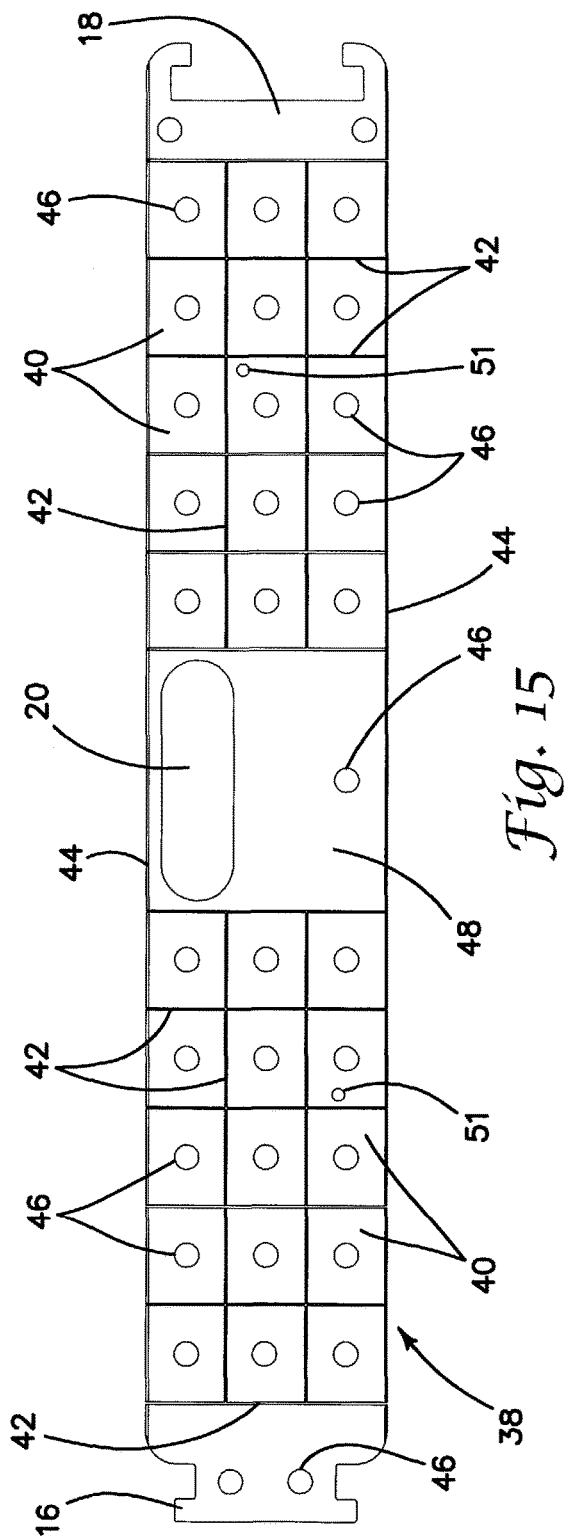
FIG. 15 is a top view of a metallic plate, preferably of steel, for providing internal support for the modular warning strip segment of FIG. 14.
Figure 17:
FIG. 17 is a detail view of the portion A of FIG. 16.
Figure 16:
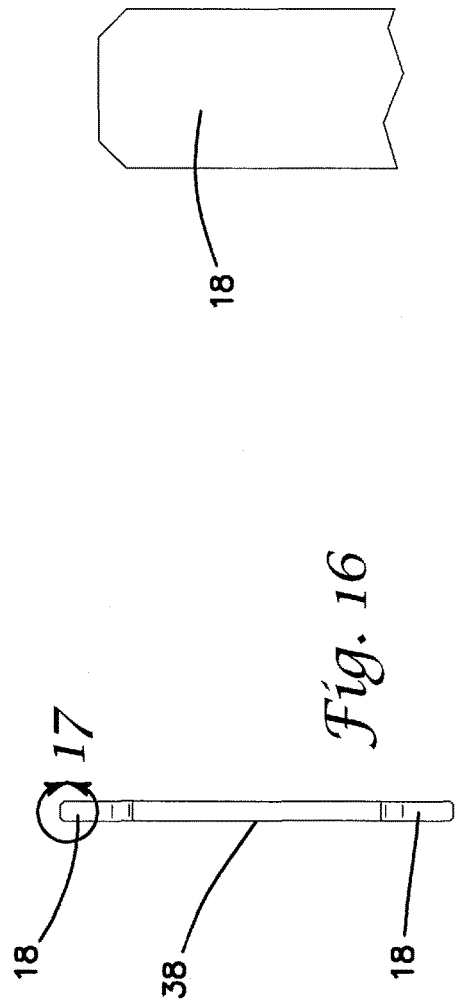
FIG. 16 is an end view of the metallic plate of FIG. 15.

As shown in FIG. 15, the segmented plate 38 is formed of a plurality of segments or ballast blocks 40 separated from one another by living hinges 42, and is, in one embodiment, about 9 inches wide. In one embodiment, each block 40 is about 4 inches long and about 3 inches wide. These living hinges 42 comprise slits or slits made in the surface of the metallic plate 38, both lengthwise and widthwise in a grid, which are preferably laser-cut, though other suitable scoring methods may be used as well. The slits or living hinges 42, are 0.005-1/16 in. in width, in certain embodiments. The plate 38 has two lengthwise edges 44. In certain embodiments, the slits 42 extend entirely through the thickness of the plate 38, except for a plurality of lands of metal extending across the width of the slit 42 from one segment 40 to the next, in spaced relationship along the length of the particular slit 42, which may be of either a reduced thickness or of the full thickness of the plate 38. In other embodiments, the slits 42 may only extend through a partial thickness of the plate 38, though the depth of the slit must be sufficient to permit adjacent segments or blocks 38 to flex and bend relative to one another.

Figure 18:
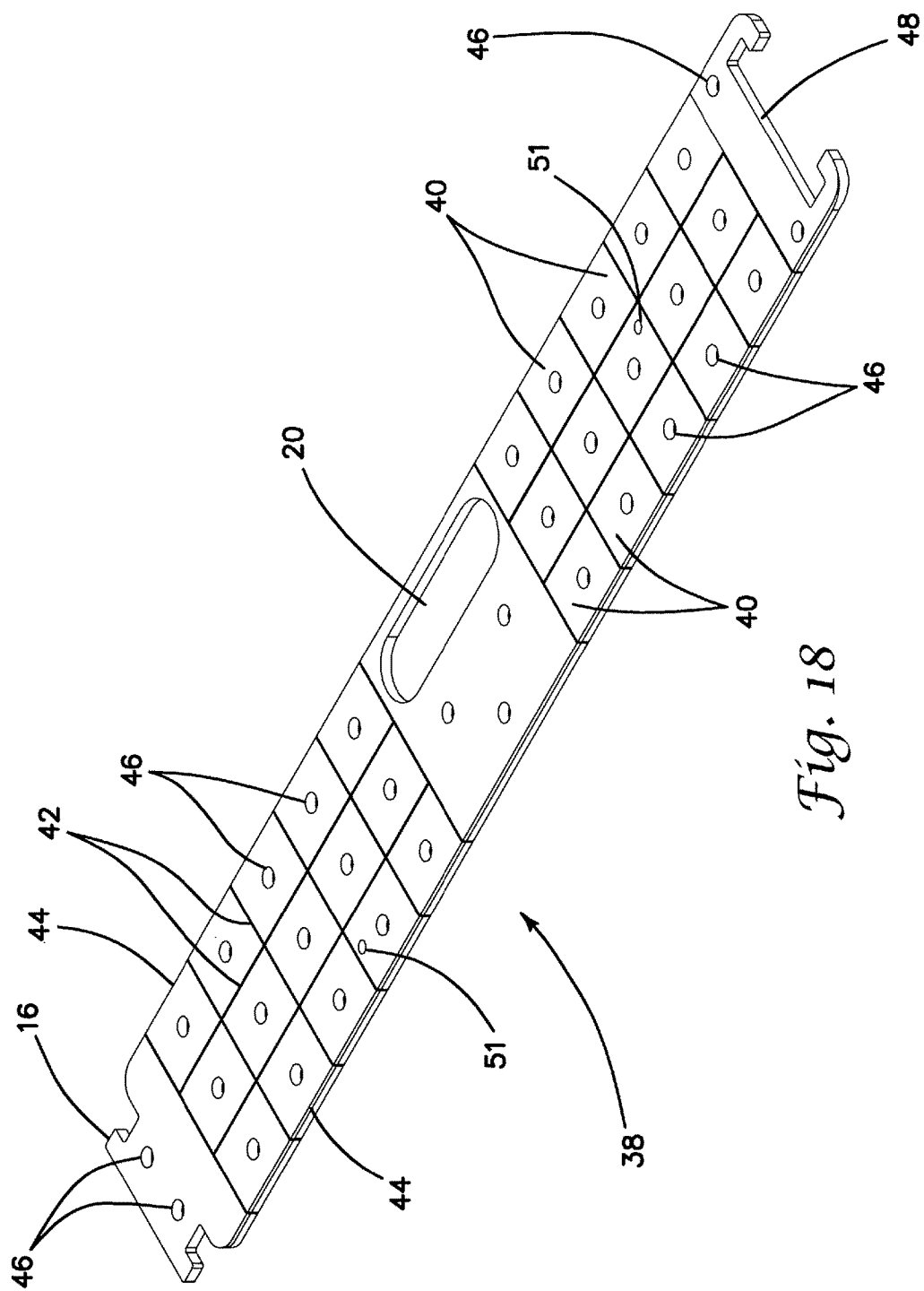
FIG. 18 is an isometric view of a metallic plate similar to that shown in FIGS. 15-17.
Figure 19:
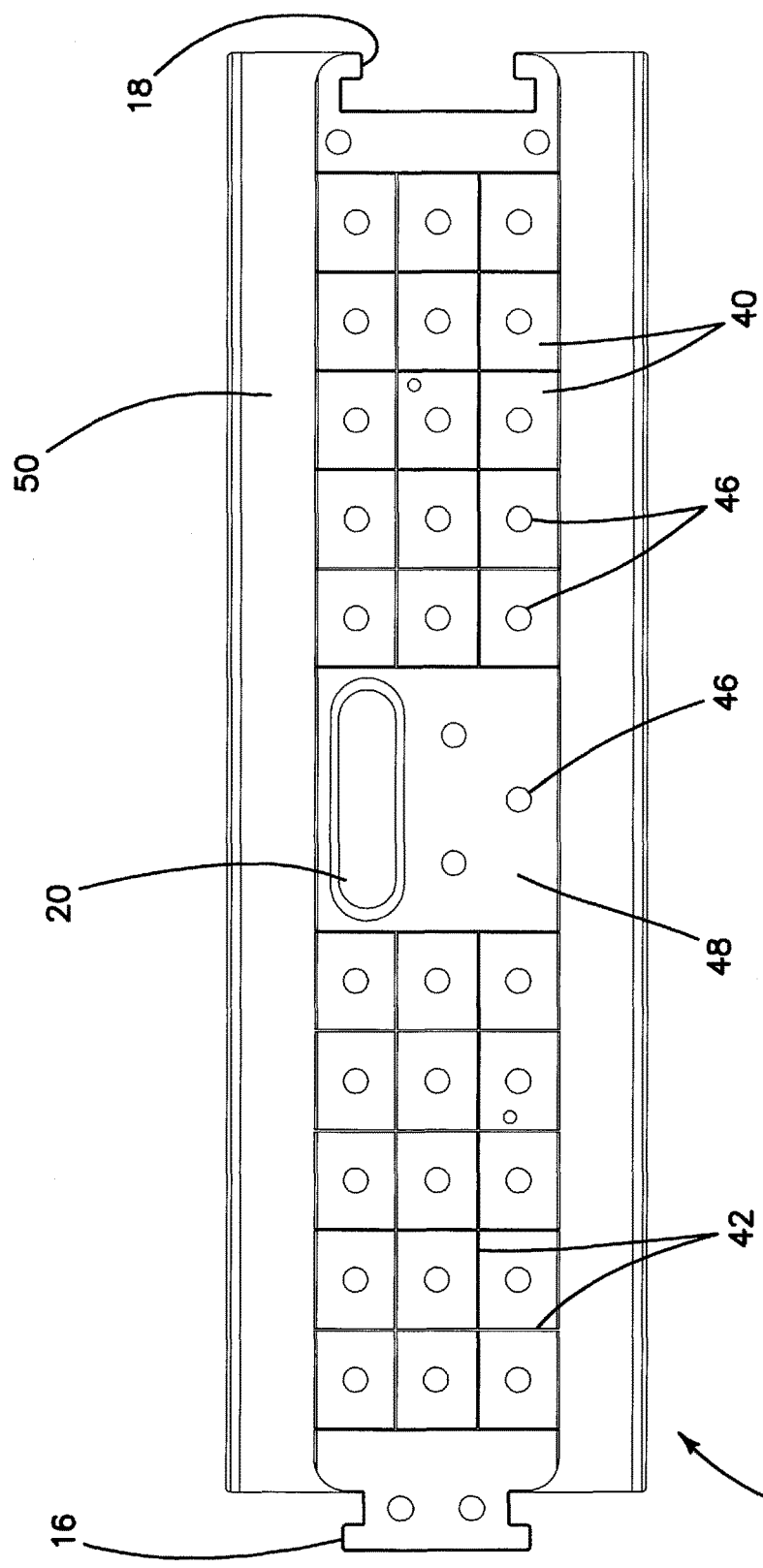
FIG. 19 is a top view of the embodiment shown in FIG. 15 with the metallic plate visible for clarity as to the construction of the warning segment assembly.

In one particular embodiment, there are twenty-eight ballast blocks 40, though, of course, this number can vary within the scope of the invention. The grid of living hinges 42, coupled with the lengthwise edges 44 of the plate 38, together define the twenty-eight ballast blocks 40, as shown in FIGS. 15, 18, and 19. As a result, each of the inside blocks 40 is defined on all four sides thereof by a living hinge 42, and the outside blocks 40 are defined by a living hinge 42 on three sides, and by the plate outside edge 44 on its remaining side.

The living hinges 42 create an extremely desirable field performance feature, which is closely spaced and controlled flexibility both axially and transversely for the warning strip segment 10 as a whole. This flexibility enables the segment 10 to easily conform to any unknown surface irregularity, which is common when dealing with uneven, potholed, or crowned road surfaces upon which the segment 10 is likely to sit when in use.

The segmented plate 38, with the individually created ballast blocks or segments 40, permits separate flexibility of individual ballast segments, one relative to another adjacent one, or groups of blocks relative to adjacent groups of blocks, in either an axial or transverse direction, while maintaining their as-manufactured, physical spacing and as-molded physical relationship to one another.

A hole 46 is drilled or otherwise created, using known fabrication techniques, in each ballast block or segment 40, as shown in FIGS. 15, 18, and 19. One or more additional such holes 46 may be formed in a center portion 48 of the plate 38. One such hole 46 is illustrated in FIG. 15, while three holes 46 are illustrated in the center portion 48 in FIG. 18 or 19—either arrangement is within the scope of the invention, as well as any other desired number of such holes 46. Holes 46 are also illustrated in each of the end portions 16 and 18. It is not required that there be a hole 46 in every segment 40, or in the center portion 48, or in the end portions 16, 18, but there should be a sufficient number of holes 46 spaced across the surface of the plate 38 to ensure the function described for the holes 46 below. In one embodiment, the diameter of each hole 46 is ¾ inch, but the size may be adjusted as desired to suit application and preferences as long as functionality is maintained. A handle hole 20 is also formed in the center region 48, in order to ensure that the finished segment includes such a handle 20. The plate 38 also includes a male protrusion 16 formed at a first end and a female receptacle 18 formed at the second end thereof, in order to ensure that the finished molded segment assembly 10 will include those features.

Now, a method for compression molding and fabricating a modular warning strip segment according to the invention will be described, in conjunction with the embodiment illustrated in FIGS. 14-20. Initially, one slab or layer of vulcanizable rubber is first laid into the top of the mold (the part is molded upside-down), over three locating pins which will protrude through the top surface of the rubber layer. The three locating pins are used to locate and precisely position the segmented metal plate 38 within the open mold, atop the initial rubber layer, the locating pins extending through locating pin holes 51 in the plate 38. Once the segmented ballast plate 38 is positioned on the three locating pins protruding through the slap or layer of rubber already placed in the mold, the tool is ready for the final step prior to molding.

Atop the first slab of rubber and the segmented steel plate 38, positioned in the mold on its three standoff pins, a second layer of vulcanizable rubber is laid. At this point, the mold is ready to be closed, with the segmented steel plate 38 sandwiched in the middle of the molded product, between the two rubber layers. In one particular embodiment, the plate 38 is about 5/16 inches thick, while each of the two rubber layers are about ¼ inch thick, though these dimensions may be modified to a certain extent, depending upon design considerations.

When the mold is closed, and the rubber is heated in the pre-heated press, the vulcanizable rubber comprising each of the two rubber layers becomes a viscous fluid. Under the tremendous pressure of the compression molding press, the molten rubber flows through the formed holes 46 in the metal plate 38. This process creates what is essentially a rubber bolt extending through each of the holes between the upper rubber layer and the lower rubber layer of the finished assembly, which ensures the stability and position of each of the three layers, relative to one another, since each of the layers and the plate are linked.

The free flowing rubber also will extrude itself into and through (if the slit 42 extends through the entire thickness of the plate 38) each of the 1/16 inch wide laser cut spaces or living hinges 42 between each ballast block 40, thereby creating a vulcanized rubber living hinge 42.

FIG. 19 illustrates a partially completed warning strip segment 10, with the top layer of rubber removed for illustrative purposes, in order to show how the metal plate 38 is situated within the assembly 10. Thus, lower rubber layer 50 is illustrated, with the metal plate 38 situated within that layer 50, as shown. The aforementioned rubber bolts fill each of the holes 46 to secure the layers and the plate together.

Figure 14:
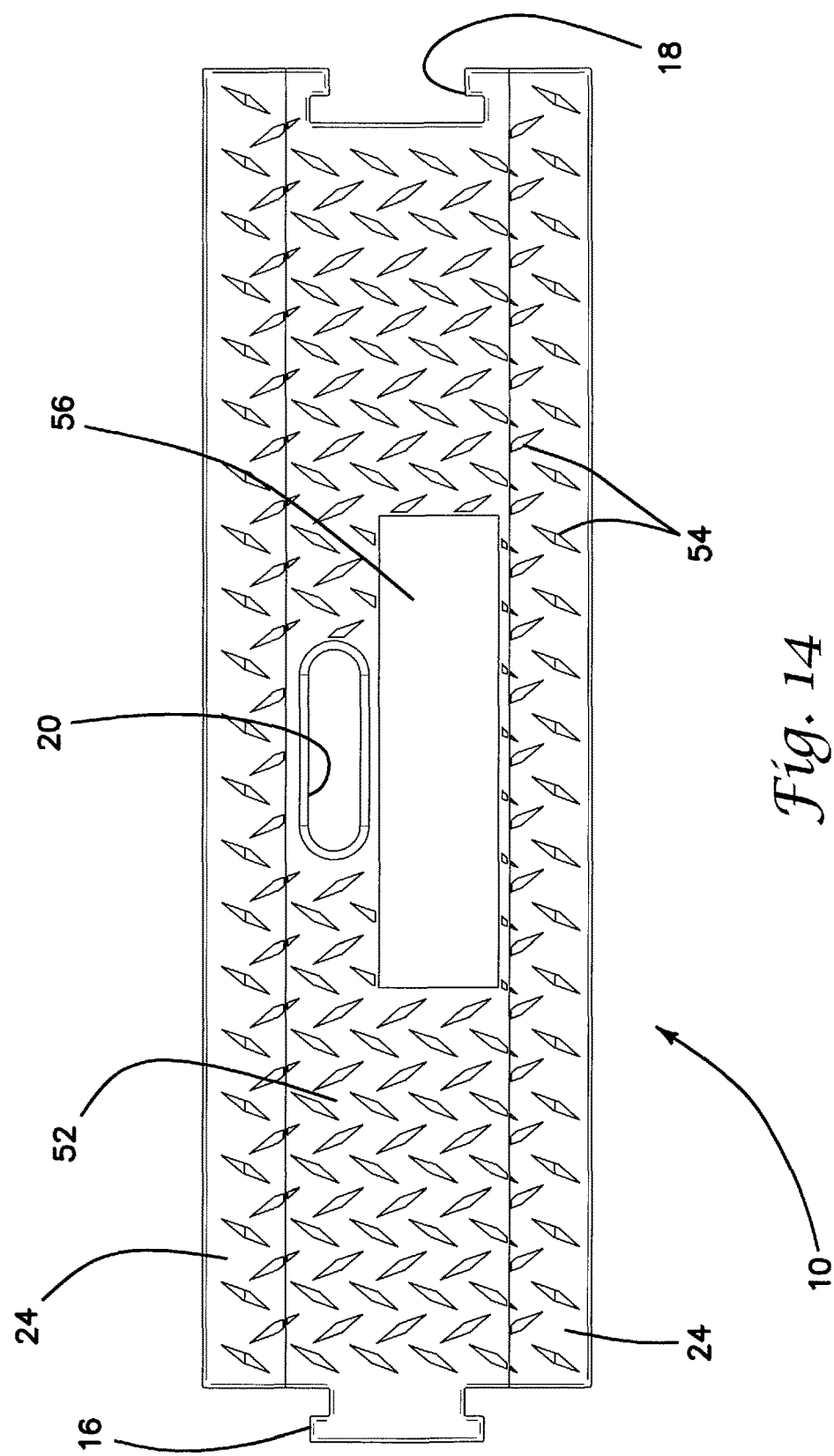
FIG. 14 is a top view of a modified embodiment of a modular warning strip segment according to the present invention.

FIGS. 14 and 20 illustrate a completed, molded warning strip segment 10, according to the invention. In these figures, the upper rubber layer 52 is shown, sandwiching the metal plate 38 between itself and the lower rubber layer 38. The top surface of the upper rubber layer 52 is substantially smooth in order to prevent injury to motorcyclists and other two-wheeled vehicles which may travel over the strip, with only optional molded traction bumps 54 disposed thereon. An information block 56 is provided, in the event it is desired to mold information therein, such as company name, contact information, model information, or the like. As shown in FIG. 20, any number of warning strip segments 10 may be joined end-to-end by securing the male protrusion 16 of one segment 10 into the female receptacle 18 of an adjacent segment 10, as shown. Although only one of each of male protrusions 16 and female receptacles 18 are disposed on each segment 10, as shown, other joining configurations could be employed, such as the one shown in FIGS. 1-13, particularly if there is a desire to join the segments 10 in an offset manner, as shown in FIG. 9.

Important objectives that are met by this invention are as follows:

1) The modular warning strip segment 10 is sufficiently heavy to stay in place with minimal movement when run over by a vehicle, but not too heavy for one person to lift, position, or handle.

2) An assembly of segments 10, when joined together as shown in FIG. 8, 9, or 20, must be rigid enough, particularly at the linkable joints, so that they do not separate from one another when a vehicle runs over them.

3) The segments 10, both individually and when assembled, must be flexible enough to conform to varied and uneven roadway surfaces. The flexibility needs to be intimately connected to an idyllic weight and closely linked to close proximity flexibility both axially and transversely, preferably.

4) The segment 10 is about 12-14 inches in width, with very gentle approaching and departing ramped portions 24, each about 1½-2½ inches in width, having lead in and exit angles of a maximum of 15 degrees, and preferably 10 degrees. Importantly, with respect to the embodiment of FIGS. 14-20, the metal plate 38 does not extend into the ramped portions 24 of the segment 10, thereby improving flexibility for positioning of the segments, and for driving over the segments and ensuring that the segments conform to the roadway surface.

5) Each segment has a maximum height of about ¾ inches with a length of about 4 feet.

6) With respect particularly to the embodiment of FIGS. 14-20, the small laser slits or living hinges 42 are a big advantage over using separate spaced plates, because positioning a single plate in the mold, rather than a plurality of separate plates, improves efficiency and precision in manufacture.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A modular highway warning strip system comprising:
a modular warning strip having first and second ends, a length extending between said first and second ends, two opposing lengthwise sides, a width extending between the opposing lengthwise sides of the strip, top and bottom surfaces, and a thickness;
one of said first and second ends comprising at least one male protrusion and at least one female receptacle, wherein the at least one male protrusion is configured to engage the at least one female receptacle;
the modular warning strip comprising a plurality of metallic segments each having a predetermined thickness and a length extending across the width of the strip, the plurality of metallic segments each being joined to one another by one or more metallic connectors, the metallic connectors having either a thickness less than the predetermined thickness or a length less than the length of one of the metallic segments;
wherein the plurality of metallic segments are distributed along most of the length of the modular warning strip between the first and second ends thereof.

2. The modular highway warning strip system as recited in claim 1, wherein each of the opposing lengthwise sides comprise ramps, and further wherein the top surface of the segment slopes downwardly to the outside edge thereof so that the edge of the segment has a smaller thickness than a center portion of the segment.

3. The modular highway warning strip system as recited in claim 1, and further comprising a plurality of said modular warning strip segments joined together end-to-end by engagement of corresponding ones of the male protrusion and female receptacle.

4. The modular highway warning strip system as recited in claim 1, wherein the metallic connectors comprising living hinges.

5. The modular highway warning strip system as recited in claim 1, wherein there are a plurality of metallic connectors disposed between adjacent metallic segments.

6. The modular highway warning strip system as recited in claim 1, wherein the metallic connectors each have a thickness less than the predetermined thickness.

7. The modular highway warning strip system as recited in claim 1, wherein the plurality of metallic segments are distributed along the entire length of the modular warning strip between the first and second ends thereof.

8. The modular highway warning strip system as recited in claim 1, wherein at least some of the plurality of metallic segments include one or more holes disposed therein.

9. The modular highway warning strip system as recited in claim 8, wherein the holes are filled with a molded material.

10. The modular highway warning strip system as recited in claim 9, and further comprising a lower molded material layer disposed on at least one of the plurality of metallic segments.

11. The modular highway warning strip system as recited in claim 10, wherein the lower molded material layer is joined with the molded material filing the hole or holes in the at least one of the plurality of metallic segments.

12. The modular highway warning strip system as recited in claim 10, wherein the molded material comprises rubber.

13. The modular highway warning strip system as recited in claim 1, and further comprising a metallic handle.

14. The modular highway warning strip as recited in claim 1, wherein at least one of the metallic segments disposed in a center portion of the length of the warning strip is differently constructed than others of the plurality of metallic segments distributed along remaining portions on either side, lengthwise, of the center portion of the length of the warning strip.

15. The modular highway warning strip as recited in claim 14, wherein the at least one differently constructed metallic segment is substantially wider than the remaining metallic segments.

16. The modular highway warning strip as recited in claim 15, wherein a handle is disposed in the differently constructed metallic segment.

* * * * *